(12) United States Patent
Gabin et al.

(10) Patent No.: US 10,530,400 B2
(45) Date of Patent: *Jan. 7, 2020

(54) METHODS, NETWORK NODES, COMPUTER PROGRAMS AND COMPUTER PROGRAM PRODUCTS FOR MANAGING PROCESSING OF AN AUDIO STREAM

(71) Applicant: Telefonaktiebolaget LM Ericsson (publ), Stockholm (SE)

(72) Inventors: Frederic Gabin, Bagnolet (FR); Anders K. Eriksson, Uppsala (SE); Tomas Frankkila, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/918,589

(22) Filed: Mar. 12, 2018

(65) Prior Publication Data
US 2018/0205401 A1 Jul. 19, 2018

Related U.S. Application Data

(63) Continuation of application No. 14/900,673, filed as application No. PCT/SE2013/050762 on Jun. 25, 2013, now Pat. No. 9,954,565.

(51) Int. Cl.
*H04B 1/00* (2006.01)
*H04B 15/00* (2006.01)
(Continued)

(52) U.S. Cl.
CPC ....... *H04B 1/0475* (2013.01); *H04L 65/4084* (2013.01); *H04L 65/4092* (2013.01);
(Continued)

(58) Field of Classification Search
CPC ............... H04L 65/602; H04L 65/4092; H04L 65/4084; H04L 65/608; H04L 69/24;
(Continued)

(56) References Cited

U.S. PATENT DOCUMENTS 8,639,516 B2 1/2014 Lindahl et al.
9,197,974 B1 11/2015 Clark et al.
(Continued)

FOREIGN PATENT DOCUMENTS

CN 101699831 B 5/2012
WO 2009113926 A1 9/2009

OTHER PUBLICATIONS

Rosenberg, J. et al., "An Offer/Answer Model with the Session Description Protocol (SDP)", Internet Engineering Task Force, Network Working Group, Request for Comments: 3264, Obsoletes: 2543, Category: Standards Track, Jun. 2002, pp. 1-24.
(Continued)

*Primary Examiner* — Nhan T Le
(74) *Attorney, Agent, or Firm* — Murphy, Bilak & Homiller, PLLC

(57) ABSTRACT

A method and a first node for managing processing of an audio stream as well as a method and a second node for enabling management, by a first node, of processing of an audio stream and corresponding computer programs and computer program products are disclosed. The audio stream is receivable from the second node. The first node sends, to the second node, information relating to at least one preference concerning acoustic characteristics of the audio stream. The second node processes the audio stream in response to the information relating to the at least one preference concerning the acoustic characteristics. The second node transmits the audio stream to the first node.

18 Claims, 4 Drawing Sheets

(51) Int. Cl.
  *H04B 1/04* (2006.01)
  *H04L 29/06* (2006.01)
  *H04W 8/18* (2009.01)
  *G10L 19/22* (2013.01)
  *H04M 1/19* (2006.01)
  *H04W 80/10* (2009.01)

(52) U.S. Cl.
  CPC ............ *H04L 65/602* (2013.01); *H04L 69/24* (2013.01); *H04W 8/18* (2013.01); *G10L 19/22* (2013.01); *H04L 65/608* (2013.01); *H04M 1/19* (2013.01); *H04W 80/10* (2013.01)

(58) Field of Classification Search
  CPC ........ H04B 1/0475; H04M 1/19; H04W 8/18; H04W 80/10
  See application file for complete search history.

(56) References Cited

U.S. PATENT DOCUMENTS

| | | |
|---|---|---|
| 9,536,540 B2 | 1/2017 | Avendano et al. |
| 9,558,755 B1 | 1/2017 | Laroche et al. |
| 9,699,554 B1 | 7/2017 | Choi et al. |
| 9,799,330 B2 | 10/2017 | Nemala et al. |
| 9,954,565 B2* | 4/2018 | Gabin ...................... H04L 69/24 |
| 2004/0017817 A1* | 1/2004 | Jameson ................ H04L 67/12 370/400 |
| 2005/0008167 A1 | 1/2005 | Gleissner et al. |
| 2009/0245345 A1* | 10/2009 | Lee .......... H04N 5/44 375/240.01 |
| 2010/0188967 A1* | 7/2010 | Michaelis ................ H04L 1/22 370/216 |
| 2014/0114665 A1 | 4/2014 | Murgia |
| 2016/0249364 A1* | 8/2016 | Siomina ............. H04W 72/082 |

OTHER PUBLICATIONS

Unknown, Author, "3GPP TS 24.173 V11.5.0 (Mar. 2013)", 3rd Generation Partnership Project; Technical Specification Group Core Network and Terminals; IMS multimedia telephony communication service and supplementary services; Stage 3 (Release 11), Mar. 2013, pp. 1-17.

Unknown, Author, "3GPP TS 26.114 V1.2.1 (Jan. 28, 2007)", 3rd Generation Partnership Project; Technical Specification Group Services and System Aspects IP Multimedia Subsystem (IMS); Multimedia Telephony; Media handling and interaction (Release 7), TSF-SA4 internal working draft, S4-070086, Jan. 2007, pp. 1-76.

\* cited by examiner

METHODS, NETWORK NODES, COMPUTER PROGRAMS AND COMPUTER PROGRAM PRODUCTS FOR MANAGING PROCESSING OF AN AUDIO STREAM

RELATED APPLICATIONS

This application is a continuation of U.S. application Ser. No. 14/900,673 filed 22 Dec. 2015, which is a U.S. National Phase Application of PCT/SE2013/050762 filed 25 Jun. 2013. The entire contents of each of the aforementioned applications are incorporated herein by reference.

TECHNICAL FIELD

Embodiments herein relate to audio communication within wired communication systems and wireless communication systems, such as telecommunication systems. A method and a first node for managing processing of an audio stream as well as a method and a second node for enabling management, by a first node, of processing of an audio stream and corresponding computer programs and computer program products are disclosed.

BACKGROUND

Audio communication, or speech communication, is defined by many different standards and can be used in different networks such as Public Switched Telephone Networks (PSTN), second and third generation of telecommunication systems (2G and 3G systems), Third Generation Partnership Project (3GPP TS 24.173) over High Speed Packet Access, Fourth Generation (4G) using Voice over Long Term Evolution (VoLTE) speech and audio communication, Voice over Internet Protocol (VoIP) communications.

In audio communication, an audio signal is picked up, or captured, by a microphone, amplified to a desired level, filtered, digitally sampled, processed to remove acoustic echo, compensate for electrical and mechanical acoustic characteristic response, or reduce background noises. Then, the signal is encoded to reduce the bitrate once transmitted over the transmission channel, generally a radio channel or a wire, before the signal is received by a distant terminal and processed and played back over an earpiece, headset or loudspeaker.

During play back, it has been found that users have personal preferences when it comes to noise suppression levels. For example, some persons like to have a minimum of background noise when listening to other people, even if the noise suppression algorithm affects the speech quality with clipping and codec artifacts and sound distortion. Some other people like to have a little noise in the background. For example, with a little noise in the background, it may be avoided that there is complete silence when a distant person is not talking. Such complete silence may give the listening user the impression that communication is broken. Other people like to have all the background noise information, so they understand the context of the other person and experience no artifacts or clipping on the speech.

The user's preference for the noise suppression level may also be different in different situations. For example, when user A is calling user B who is attending a football game, then user A may want little noise suppression to get a better experience of the atmosphere at the stadium. Another example is when user A is calling user B who is in a very noisy factory. In this case, the intelligibility of speech of user B may be very poor due to a high noise level from activities in the factory.

It has also been observed that the user's preference is biased by the cultural environment of the user. For example, US mobile operators seem to favor aggressive noise suppression. This may mean that for each individual user there may be an individual preference of when the noise suppression is perceived as optimal in that particular user's point of view. Typically, a quality of the audio, as perceived by a particular user, increases with increasingly more aggressive noise suppression. However, at some point, there will be cuts, or interruptions in the audio. Then, the particular user will consider the quality of the audio to decrease.

Similar to how quality of audio varies with noise suppression level, quality of audio varies with audio bandwidth and speech level. Users, in particular when elderly and slightly hearing impaired, find it more intelligible when the speech signal is within certain frequency limits and has certain levels. However, recent advances in terminal acoustics and speech coding, e.g., Adaptive Multi-Rate Wideband (AMR-WB), allow for larger audio bandwidths to be represented.

To adopt the audio to the user's preference, it has been proposed to apply the user's preference to the audio before the audio is played back to the user. WO2009/113926 discloses a known solution for providing selective control of buffering of at least one media stream. According to the known solution, a communication device includes a jitter buffer and a jitter buffer control unit. The jitter buffer control unit set a buffer strategy based on an instruction, originating from a user input. Then, a data stream is received and buffered, in the jitter buffer, based on the buffer strategy. In relation to for example the above noted individual or cultural user preferences, a disadvantage of the known solution may be that the user nevertheless sometimes is dissatisfied with the perceived quality of the data stream.

SUMMARY

An object is to enable improved user experience in for example systems comprising communication devices of the above-mentioned kinds.

According to an aspect, the object is achieved by a method, performed by a first node, for managing processing of an audio stream. The audio stream is receivable from a second node. The first node sends, to the second node, information relating to at least one preference concerning acoustic characteristics of the audio stream. The first node receives the audio stream from the second node. The audio stream has been processed, by the second node, in response to the information relating to the at least one preference concerning the acoustic characteristics of the audio stream.

According to another aspect, the object is achieved by a first node configured to manage processing of an audio stream. The audio stream is receivable from a second node. The first node comprises a processing circuit configured to send, to the second node, information relating to at least one preference concerning acoustic characteristics of the audio stream. Moreover, the processing circuit is configured to receive the audio stream from the second node. The audio stream has been processed, by the second node, in response to the information relating to the at least one preference concerning the acoustic characteristics of the audio stream.

According to a further aspect, the object is achieved by a method, performed by a second node, for enabling management, by a first node, of processing of an audio stream. The audio stream is transmittable to the first node. The second node receives, from the first node, information relating to at least one preference concerning acoustic characteristics of the audio stream. The second node processes the audio stream in response to the information relating to the at least one preference concerning the acoustic characteristics. The second node transmits the audio stream to the first node.

According to yet another aspect, the object is achieved by a second node configured to enable management, by a first node, of processing of an audio stream. The audio stream is transmittable to the first node. The second node comprises a processing circuit configured to receive, from the first node, information relating to at least one preference concerning acoustic characteristics of the audio stream. Moreover, the processing circuit is configured to process the audio stream in response to the information relating to the at least one preference concerning the acoustic characteristics. Furthermore, the processing circuit is configured to transmit the audio stream to the first node.

According to a still other aspect, the object is achieved by a computer program for managing processing of an audio stream. The audio stream is receivable from a second node. The computer program comprises computer readable code units which when executed on a first node causes the first node to send, to the second node, information relating to at least one preference concerning acoustic characteristics of the audio stream. Moreover, the computer program enables the first node to receive the audio stream from the second node. The audio stream has been processed, by the second node, in response to the information relating to the at least one preference concerning the acoustic characteristics of the audio stream.

According to a still further aspect, the object is achieved by a computer program product, comprising computer readable medium and a computer program, as described above, stored on the computer readable medium.

According to an additional aspect, the object is achieved by a computer program for enabling management, by a first node, of processing of an audio stream. The audio stream is transmittable by a second node. The computer program comprises computer readable code units which when executed on the second node causes the second node to receive, from the first node, information relating to at least one preference concerning acoustic characteristics of the audio stream. Moreover, the second node is caused to, when the computer program is executed on the second node, process the audio stream in response to the information relating to the at least one preference concerning the acoustic characteristics. Furthermore, the second node is caused to, when the computer program is executed on the second node, transmit the audio stream to the first node.

According to a further aspect, the object is achieved by a computer program product, comprising computer readable medium and a computer program, as described above, stored on the computer readable medium.

As an example, the information relating to at least one preference concerning acoustic characteristics of the audio stream may be information about preference settings. Hence, the first node sends the information about preference settings to the second node. In this manner, the second node is made aware of the preference settings. The preference settings may then completely or partially be applied by the second node when processing the audio stream. The processing of the audio stream may be performed before the audio stream is encoded using a codec technique, such as AMR-WB or the like. Next, the audio stream is transmitted by the second node to the first node.

Furthermore, when the audio stream, represented by a speech/audio conversation session, is about to be established, or is on-going, a user of the first node may allow the second node to know what preference settings, the user prefers. The acoustic characteristics, e.g. the preference settings, may be a level for suppression of noise in the audio stream, a level of speech in the audio stream, a bandwidth of the audio stream. Subsequently, the second node applies, as far as possible, the preference settings. As a result, the above-mentioned object is achieved.

Advantageously, the received audio stream matches, at least to some extent, the at least one preference concerning acoustic characteristics.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
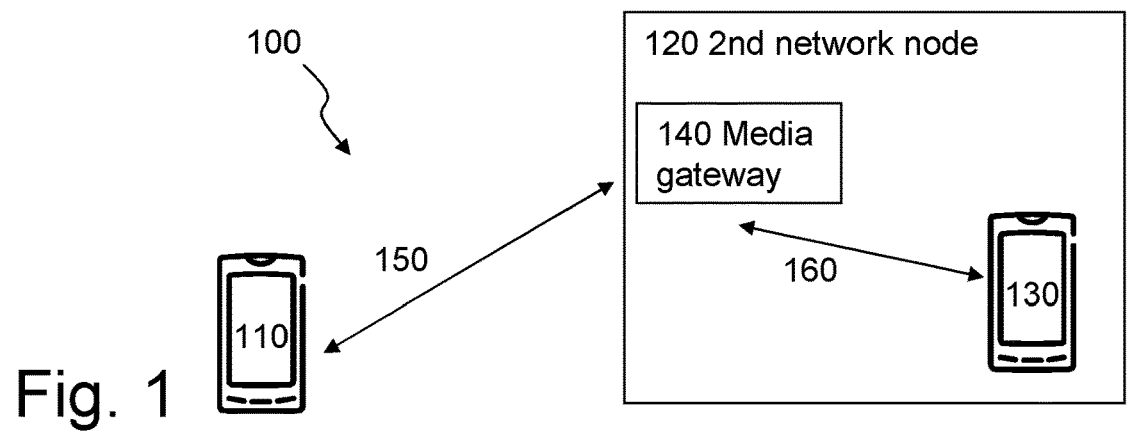
FIG. 1 is a schematic overview of an exemplifying radio communication system in which embodiments herein may be implemented.

Throughout the following description similar reference numerals have been used to denote similar elements, units, modules, circuits, nodes, parts, items or features, when applicable. In the Figures, features that appear in some embodiments are indicated by dashed lines.

FIG. 1 depicts an exemplifying radio communications system 100 in which embodiments herein may be implemented. In this example, the radio communications system 100 is a Long Term Evolution (LTE) system. In other examples, the radio communication system may be any 3GPP cellular communication system, such as a Wideband Code Division Multiple Access (WCDMA) network, a Global System for Mobile communication (GSM network) or the like. The embodiments herein may also be implemented in various wired communication systems.

The radio communication system 100 comprises a first node 110 and a second node 120. The first node 110 may be a user equipment and the second node 120 may be another user equipment 130 or a media gateway 140, such as a Media Gateway processing Function (MGF) while using terminology from the field of audio communication. In other examples, the first node 110 may be a first network node and the second node 120 may be a second network node.

As used herein, the term "user equipment" may refer to a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a fixed VoIP phone or the like.

As used herein, the term "network node" may preferably refer to a media gateway node, but sometimes the term may refer to a base station, a radio network node, a radio network controller, a base station controller, a radio network node or the like.

In some examples, a first user may use the first node 110 and a second user may use the second node 120.

Figure 2:
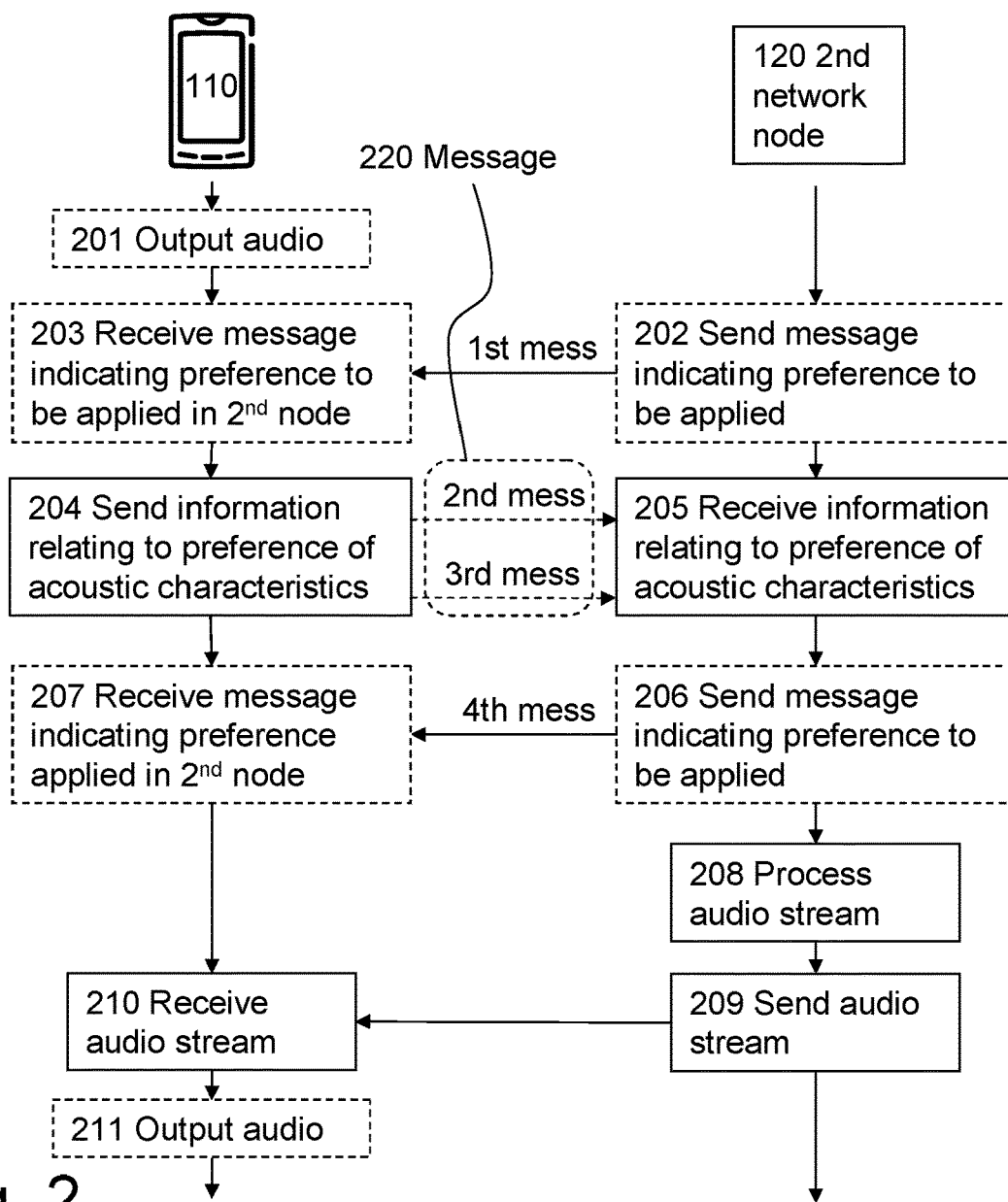
FIG. 2 is a schematic, combined signaling scheme and flowchart illustrating embodiments of the methods when performed in the radio communication system according to FIG. 1.

FIG. 2 illustrates an exemplifying method according to embodiments herein when implemented in the radio communication system 100 of FIG. 1. Thus, the first node 110 performs a method for managing processing of an audio stream and the second node 120 performs a method for enabling management, by the first node 110, of processing of the audio stream. The audio stream is transmittable to the first node 110. The audio stream may typically carry speech from a user of the second node 120. However, the audio stream may also, or instead, carry audio representing music, audio corresponding to a movie or the like.

Initially, before the actions 201 to 211 are performed, a session for transfer of an audio stream from the second node 120 to the first node 110 may be about to be set up. This is described in more detail in section "signalling at session set up" below.

Alternatively, a session for transfer of an audio stream from the second node 120 to the first node 110 is already on-going. This is described in more detail in section "signalling during a session" below. In case there is an on-going session, action 201 may be performed since the first node 110 currently receives (action not shown) an audio stream from the second node 120.

The following actions may be performed in any suitable order.

Action 201

The first node 110 may output audio generated from an audio stream received (as mentioned action not shown) from the second node 120. This means that the audio may be generated from an audio stream received during an already on-going session. Thanks to that the first node 110 may output the audio, a user of the first node 110 may listen to the audio. In this context, output of audio may mean that the audio is output to, e.g. a speaker of the first node 110 or headphones connected to the first node 110.

Action 202

In some first embodiments, the second node 120 may suggest preferences concerning acoustic characteristics to apply by itself. As an example, the second user may thus suggest some preferences to the first user, which then selects from the suggested preferences. It may be that the second user selects the suggested preferences from a list, displayed in a user interface of the second node 120. This list may only display available preferences, i.e. those preferences that may be supported by the second node 120. The selected preference may then be sent in action 204. Alternatively, pre-defined or preferences stored in the second node 120 may be sent in this action 202.

Hence, in order to suggest preferences, the second node 120 may send, to the first node 110, a message indicating at least one preference concerning the acoustic characteristics to be applied, at least partly, by the second node 120 when processing the audio stream in action 208. This message is referred to as a first message herein.

Action 203

Accordingly subsequent to action 202, in the first embodiments, the first node 110 may receive, from the second node 120, the first message.

Action 204

In order for the second node 120 to be aware of which preference concerning acoustic characteristics, the first node 110 sends, to the second node 120, information relating to at least one preference concerning acoustic characteristics of the audio stream.

The at least one preference concerning acoustic characteristics may relate to one or more of: a level for suppression of noise in the audio stream, a level of speech in the audio stream, a bandwidth of the audio stream, and the like.

The level of suppression of noise in the audio stream, or a noise suppression level for short. Merely as an example, "−10 dB" is a noise suppression of 10 dB applied to noise in the audio stream.

The level of speech in the audio stream, or speech level for short, determines a default volume of the speech.

In more detail, the bandwidth of the audio stream refers to a bandwidth of audio generated from the audio stream.

The at least one preference concerning acoustic characteristics may be determined by a previous or current user of the first node 110. This may mean that the at least one preference may be stored in the first node 110 or that a user interface may be invoked to receive the at least one preference from the first user. Alternatively, the at least one preference concerning acoustic characteristics may be determined by an operator. This means that the user interface may be activated by the first node 110 in order to make it possible for the first node 110 to receive, from the first user, the information relating to the at least one preference concerning acoustic characteristics. Thus, the first node 110 may include the user interface (not shown). When the operator determines the at least one preference, default preferences may be applied. Default preferences may be pre-defined, or pre-determined for example according to some average preference among some specific group of users.

In case, a session is to be set up, the information relating to at least one preference concerning acoustic characteristics may be comprised in at least one Session Description Protocol (SDP) parameter in a Session Initiation Protocol (SIP) INVITE and Response message 220. In more detail, the information may be comprised in e.g. in an SDP Offer/answer message as part of the SIP INVITE and Response message 220.

In case, a session is already on-going, the information relating to at least one preference concerning acoustic characteristics may be comprised in one of at least one SDP parameter in a SIP UPDATE and Response message 220, at least one Real-time Transport Control Protocol (RTCP) parameter, and a Real-time Transport Protocol (RTP) header extension.

If an RTP header extension is used, the information relating to acoustic characteristics is comprised in the RTP header extension may comprises one or more fields for carrying the information relating to acoustic characteristics. Said one or more fields may be defined in a related standard specification like e.g. Internet Engineering Task Force (IETF) or 3GPP or in a specification of the first node. The specification of the first node 110 may be defined by the vendor or manufacturer of the first node 110.

In the first embodiments, the information relating to the at least one preference concerning the acoustic characteristics may comprise a message for acknowledging use of the at least one preference concerning the acoustic characteristics indicated in the first message. This message for acknowledging use may be referred to as a second message herein. When the at least one preference concerning acoustic characteristics is used, the second node 120 may at least partly apply the at least one preference concerning the acoustic characteristics. For example, the at least one preference concerning the acoustic characteristics indicates, or comprises, a noise suppression level. Then, the second node 120 may have suggested 10 dB as noise suppression level in action 202. However, the first node 110 may in some case only acknowledge application of e.g. 6 dB as noise suppression level by indication in the second message. Hence, the acknowledged application of the at least one preference concerning acoustic characteristic may be used in action 208 below. This may mean that the second message may be a short message stating OK or not OK or a longer message indicating OK and a value, such as 6 dB, of the acknowledged preference concerning acoustic characteristics.

It shall be understood that in some examples, the second message may not acknowledge use of the at least one preference concerning acoustic characteristics at all. In such examples none of the at least one preference is applied in action 208.

In some second embodiments, the information relating to the at least one preference concerning the acoustic characteristics may comprise a message for instructing the second node 120 to apply the at least one preference concerning the acoustic characteristics when processing the audio stream. Notably, as is described by the second embodiments including action 206 and 207, the second node 120 is not bound to exactly apply, in action 208, the at least one preference concerning the acoustic characteristics when processing the audio stream in action 208. The message for instructing the second node 120 may be referred to as a third message herein.

Action 205

As a consequence of action 204, the second node 120 receives, from the first node 110, information relating to at least one preference concerning acoustic characteristics of the audio stream.

In the first embodiments, the second message is received by the second node 120.

In the second embodiments, the third message is received by the second node 120.

Action 206

According to the second embodiments, the second node 120 may send, to the first node 110, a message indicating the at least partly applied, or to be applied in action 208, one of the at least one preference concerning the acoustic characteristics. Notably, in some case the message may indicate that none of the at least one preference concerning acoustic characteristics is, or will be, applied in action 208. This message may be referred to as a fourth message herein. Therefore, the fourth message may be said to indicate none or at least one preference concerning the acoustic characteristics that is, or will be applied. It is preferred that action 206 is performed before action 209, but action 206 may be performed after action 208. When action 206 is performed before action 209, the first node 110 may be informed about the applied preference concerning acoustic characteristics before the audio stream is received by the first node 110 in action 210.

Expressed somewhat differently, the fourth message is a message for acknowledging, at least in part, the third message. Hence, the second node 120 may confirm to the first node 110 what preference is, or will be, applied in action 208.

As an example, the preference concerning acoustic characteristics indicates, or comprises, a noise suppression level. Then, the third message may instruct the second node 120 to apply e.g. 10 dB as noise suppression. However, in action 206, the fourth message may indicate 8 dB as noise suppression level actually applied. Thanks to that the first node 110 may know the applied noise suppression level, i.e. 8 dB, it may refrain from once again requesting 10 dB as noise suppression in a subsequent message to the second node 120.

Action 207

In the second embodiments, the first node 110 may receive, from the second node 120, the fourth message.

Action 208

The second node 120 processes the audio stream in response to the information relating to the at least one preference concerning the acoustic characteristics.

In the first embodiments, the second node 120 processes the audio stream according to the second message. In this case, the first node 110 may know that the second node 120 will apply the acknowledged application of the at least one preference concerning acoustic characteristics since the preference concerning acoustic characteristics was, at least partly, suggested by the second node 120. It will be assumed that the second node 120 may not suggest preference concerning acoustic characteristics that it is not able to apply in this action 208.

In the second embodiments, the second node 120 processes the audio stream in response to the third message. In this case, the second node 120 may completely or partly process the audio stream according to the third message. As an example, as mentioned above, the third message may indicate 12 dB as noise suppression, while the second node 120 only is able to, or allowed to, apply 8 dB as noise suppression.

For noise suppression, it is nowadays common to apply dual- or multi-microphone technologies which have the potential of greatly improving the noise suppression performance. In these scenarios, it is required that the processing is applied by the second node 120 which transmits the audio stream in action 209.

For the level of speech in the audio stream and the bandwidth of the audio stream, an advantage of applying one or more of these preferences in the second node 120 is that the audio stream to be transmitted may be more efficiently encoded, using for example AMR-WB. A reason to that coding is more efficient may be that amount of information carried in the audio stream may be reduced when applying one or more of the level of speech in the audio stream and the bandwidth of the audio stream or that coding range may be more efficiently used.

In this context, it deserves to be mentioned that the preference concerning acoustic characteristics does not include parameters controlling the coding, using for example AMR-WB or the like. For example, a Change Mode Request (CMR) concerning bit rate for the encoding is not an acoustic characteristic.

Hence, after the processing in action 209, but before action 209 below, the second node 120 may encode the audio stream using for example AMR-WB or the like.

Action 209

The second node 120 transmits 209 the audio stream, as processed in action 208, to the first node 110. That is to say, a processed audio stream is transmitted to the first node 110.

Action 210

The first node 110 receives the audio stream from the second node 120. In more detail, the first node 110 received the processed audio stream from the second node 120.

Action 211

The first node 110 may output audio generated from the received audio stream. This action is similar to action 201, however action 211 applies to both when a session is set up and when a session is on-going. Thanks to that the first node 110 may output the audio, a user of the first node 110 may listen to the audio in way that matches the preference or the at least one preference. The preference may relate to the first user's preference, the second user's preference, a further user's preference or the operator's preference depending on how the preference concerning acoustic characteristics has been determined.

At this stage, after action 211, the audio may be output until the second node 120 stops transmission of the audio stream and any buffer for storing the audio is empty.

Signaling at Session Setup

When the first node 110 initiates or receives a call from the second node 120, it is capable of sending the preference concerning acoustic characteristics to the second node 120 during the session setup. This can be achieved by e.g. adding SDP attributes and parameters indicating the preference, as an example of the information relating to the least one preference concerning acoustic characteristics, under the m-line of the SDP file corresponding to the audio media line. E.g.:

a=Rx-acoustic-noise-suppression-level:16
a=Rx-acoustic-speech-level:12
a=Rx-acoustic-audio-bandwidth:300 3400

The unit of a=Rx-acoustic-noise-suppression-level:16 is in dB, it could also be signaled as an abstracted figure level like [0;5] with 5 corresponding to a strong noise suppression and 0 to no noise suppression at all.

The unit for a=Rx-acoustic-speech-level:12 is dBm

The unit of a=Rx-acoustic-audio-bandwidth:300 3400 is kHz.

The SDP Offer Answer model [RFC3264] is used here because the primary embodiment applies to 3GPP Multimedia Telephony Service over IP Multimedia Subsystem (IMS) which makes use of the SDP offer/answer mechanism. But any signaling mechanism used for establishment of a speech/audio session can be extended to carry such additional parameters.

The second node 120 receives the parameters and stores them in a temporary memory as preferred sender acoustic parameters values. Those values are then used to configure procedures, relating to the level of noise suppression, the level of speech, the bandwidth of the audio stream, in the second node 120. The first node 110 may also implements functions for storing the acoustic parameter value(s) of the second node 120. Similarly, the second node 120 may implement functions for storing the acoustic parameter value(s) of the first node 110.

Signaling During a Session

It is possible to change the acoustic parameters also during the session. One way to do this is to perform a new SDP offer/answer for these parameters by including them in a SIP UPDATE (or sending a new SIP INVITE, a so called "SIP re-INVITE"). In this case, the procedure is exactly the same as during the session setup as described in Section 6.2.

Changing the acoustic parameters using SIP UPDATE is a feasible solution when the changes are rare. A drawback with using SIP is that SIP signaling uses bearers with very high priority. Due to the high priority these bearers are relatively expensive, too expensive for frequent updates.

Hence, for more frequent modifications of the acoustic parameters it is better to use some other protocol like RTCP or similar.

This solution is, of course, not limited to the use of SIP or RTCP.

Interworking with Legacy Equipment

In the above description it is assumed that both the first node 110, referred to as a local terminal, and the second node 120, referred to as a remote terminal, support this functionality and signaling. By implementing this solution in the media gateway 140, some parts of the functionality can be achieved also when the remote terminal is a legacy phone either that does not support this functionality and signaling, or when it performs a fixed amount. For example, if the desired total amount of noise suppression is 16 dB, then this can be achieved in several ways:

The legacy terminal performs no noise suppression and the media gateway 140 reduces the noise by 16 dB.

Or the legacy terminal performs 5 dB of noise suppression and the media gateway 140 reduces the noise by another 11 dB.

Or the legacy terminal performs 12 dB of noise suppression and the media gateway 140 reduces the noise by another 4 dB.

However, if the legacy terminal has already performed 20 dB of noise suppression then the media gateway 140 cannot increase the noise level since it does not know what noise to inject.

Figure 3:
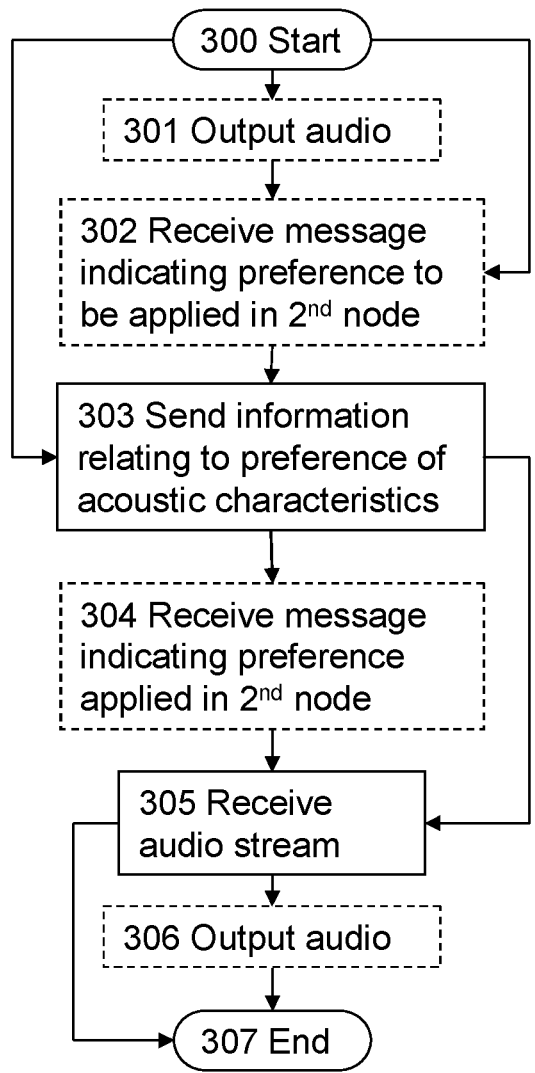
FIG. 3 is a flowchart illustrating embodiments of the method in the first node.

In FIG. 3, an exemplifying, schematic flowchart of the method in the first node 110 is shown. As mentioned, the first node 110 performs a method for managing processing of an audio stream. The audio stream is receivable from a second node 120.

The following actions may be performed in any suitable order.

State 300

In a start state 300 before the actions 301 to 306 are performed, the first node 110 may be about to set up a session for transfer of the audio stream from the second node 120 to the first node 110. See also section "signaling at session set up" above.

Alternatively, the first node 110 may in a start state 300 already have set up a session for transfer of the audio stream from the second node 120 to the first node 110. Thus, in this case action 301 may be performed since the first node 110 currently receives an audio stream (action not shown). See also section "signaling during a session" above.

Action 301

The first node 110 may output audio generated from the received audio stream. This action is similar to action 201.

Action 302

The first node 110 may receive, from the second node 120, a message indicating at least one preference concerning the acoustic characteristics to be applied by the second node 120 when processing the audio stream. The information relating to the at least one preference concerning the acoustic characteristics may comprise a message for acknowledging, at least partly, application, by the second node 120, of the at least one preference concerning the acoustic characteristics indicated in the received message indicating the at least one preference concerning the acoustic characteristics. This action is similar to action 203.

Action 303

The first node 110 sends, to the second node 120, information relating to at least one preference concerning acoustic characteristics of the audio stream. This action is similar to 204.

As mentioned, the at least one preference concerning acoustic characteristics may relate to one or more of: a level for suppression of noise in the audio stream, a level of speech in the audio stream, a bandwidth of the audio stream, and the like.

Again, the at least one preference concerning acoustic characteristics may be determined by a previous or current user of the first node 110. Alternatively, the at least one preference concerning acoustic characteristics may be determined by an operator of a radio communication system 100 comprising the first and second nodes 110, 120.

As mentioned, the information relating to at least one preference concerning acoustic characteristics may be comprised in one of:

at least one SDP parameter in a SIP INVITE and Response message;

at least one SDP parameter in a SIP UPDATE and Response message;

at least one RTCP parameter; and an RTP header extension.

Action 304

The information relating to the at least one preference concerning the acoustic characteristics may comprise a message for instructing the second node 120 to apply the at least one preference concerning the acoustic characteristics when processing the audio stream.

Then, the first node 110 may receive, from the second node 120, a message indicating one of the at least one preference concerning the acoustic characteristics. Said one of the at least one preference concerning the acoustic characteristics will be at least partly applied by the second node 120 when processing the audio stream. This action is similar to action 207.

Action 305

The first node 110 receives the audio stream from the second node 120. The audio stream has been processed, by the second node 120, in response to the information relating to the at least one preference concerning the acoustic characteristics of the audio stream. This action is similar to action 210.

Action 306

The first node 110 may output audio generated from the received audio stream. This action is similar to action 211.

State 307

In an end state 307, the first node 110 may continue to receive and output the audio stream, if the second node 120 continues transmission of the audio stream, as in action 209 above, or if any buffer for storing of the audio stream is not yet empty. Output, in action 306, of audio will be possible as long as said any buffer is not yet empty.

Alternatively, the first node 110 may in an end state 307 no longer receive or output audio, if the second node 120 stops transmission of the audio stream, or if any buffer for storing the audio is empty.

Figure 4:
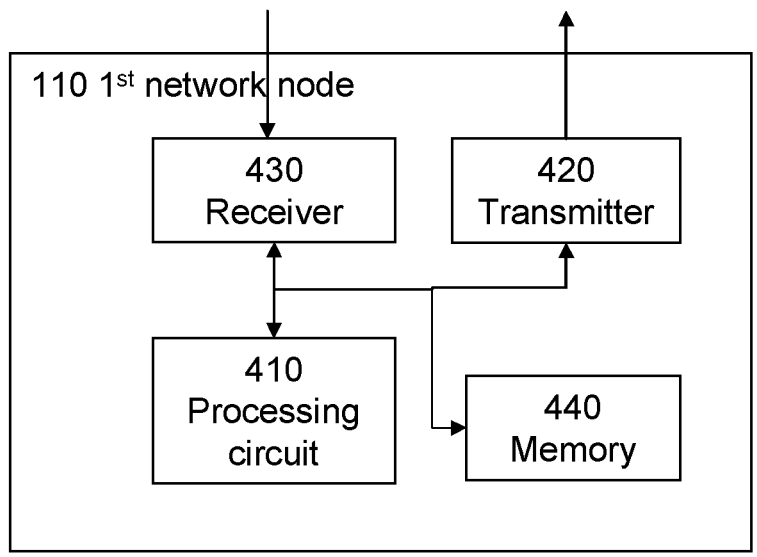
FIG. 4 is a block diagram illustrating embodiments of the first node.

With reference to FIG. 4, a schematic block diagram of the first node 110 is shown. The first node 110 is configured to perform the methods in FIG. 2 and/or 3. Thus, the first node 110 is configured to manage processing of an audio stream. As mentioned, the audio stream is receivable from a second node 120.

The first node 110 comprises a processing circuit 410 configured to send, to the second node 120, information relating to at least one preference concerning acoustic characteristics of the audio stream.

As mentioned, the at least one preference concerning acoustic characteristics may relate to one or more of: a level for suppression of noise in the audio stream, a level of speech in the audio stream, a bandwidth of the audio stream, and the like.

Again, the at least one preference concerning acoustic characteristics may be determined by a previous or current user of the first node 110. Alternatively, the at least one preference concerning acoustic characteristics may be determined by an operator of a radio communication system 100 comprising the first and second nodes 110, 120.

As mentioned, the information relating to at least one preference concerning acoustic characteristics may be comprised in one of: at least one SDP parameter in a SIP INVITE and Response message, at least one SDP parameter in a SIP UPDATE and Response message, at least one RTCP parameter, and an RTP header extension.

Moreover, the processing circuit 410 is configured to receive the audio stream from the second node 120. The audio stream has been processed, by the second node 120, in response to the information relating to the at least one preference concerning the acoustic characteristics of the audio stream.

According to the first embodiments, the processing circuit 410 may further be configured to receive, from the second node 120, a message indicating at least one preference concerning the acoustic characteristics to be applied by the second node 120 when processing the audio stream. In these embodiments, the information relating to the at least one preference concerning the acoustic characteristics may comprise a message for acknowledging, at least partly application, by the second node 120, of the at least one preference concerning the acoustic characteristics indicated in the received message indicating the at least one preference concerning the acoustic characteristics.

According to the second embodiments, the information relating to the at least one preference concerning the acoustic characteristics may comprise a message for instructing the second node 120 to apply the at least one preference concerning the acoustic characteristics when processing the audio stream. In these embodiments, the processing circuit 410 may further be configured to receive, from the second node 120, a message indicating one of the at least one preference concerning the acoustic characteristics. Said one of the at least one preference concerning the acoustic characteristics will be at least partly applied by the second node 120 when processing the audio stream.

The processing circuit 410 may further be configured to output audio generated from the received audio stream.

The first node 110 may further comprise a transmitter 420, which may be configured to send the information relating to at least one preference concerning acoustic characteristics and other numbers, values or parameters described herein.

The first node 110 may further comprise a receiver 430, which may be configured to receive the message(s) and other numbers, values or parameters described herein.

The first node 110 further comprises a memory 440 for storing software to be executed by, for example, the processing circuit. The software may comprise instructions to enable the processing circuit to perform the method in the first node 110 as described above in conjunction with FIG. 2 and/or 3.

Figure 5:
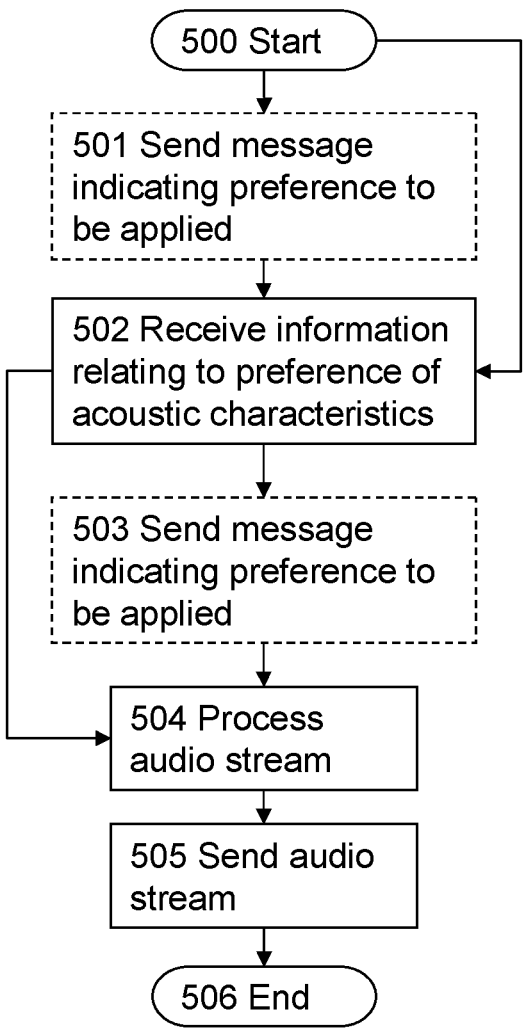
FIG. 5 is a flowchart illustrating embodiments of the method in the second node.

In FIG. 5, an exemplifying, schematic flowchart of the method in the second node 120 is shown. As mentioned, the second node 120 performs a method for enabling management, by a first node 110, of processing of an audio stream. The audio stream is transmittable to the first node 110.

The following actions may be performed in any suitable order.

State 500

In a start state 500 before the actions 501 to 505 are performed, the second node 120 may be about to transfer an audio stream to the first node 110. See also section "signalling at session set up" above.

Alternatively, the second node 120 may in a start state 500 already be involved in a session for transfer of the audio stream to the first node 110. Thus, the second node 120 already sends (action not shown) an audio stream to the first node 110. See also section "signalling during a session" above.

Action 501

The second node 120 may send, to the first node 110, a message indicating at least one preference concerning the acoustic characteristics to be applied by the second node 120 when processing the audio stream.

The information relating to the at least one preference concerning the acoustic characteristics may comprise a message for acknowledging, at least partly, application, by the second node 120, of the at least one preference concerning the acoustic characteristics indicated in the received message indicating the at least one preference concerning the acoustic characteristics. The processing of the audio stream may comprise applying, at least as partly acknowledged, the at least one preference concerning the acoustic characteristics. This action is similar to action 202.

Action 502

The second node 120 receives 205, from the first node 110, information relating to at least one preference concerning acoustic characteristics of the audio stream. This action is similar to action 205.

As mentioned, the at least one preference concerning acoustic characteristics may relate to one or more of: a level for suppression of noise in the audio stream, a level of speech in the audio stream, a bandwidth of the audio stream, and the like.

Again, the at least one preference concerning acoustic characteristics may be determined by a previous or current user of the first node 110. Alternatively, the at least one preference concerning acoustic characteristics may be determined by an operator of a radio communication system 100 comprising the first and second nodes 110, 120.

As mentioned, the information relating to at least one preference concerning acoustic characteristics may be comprised in one of: at least one SDP parameter in a SIP INVITE and Response message, at least one SDP parameter in a SIP UPDATE and Response message, at least one RTCP parameter, and an RTP header extension.

Action 503

The information relating to the at least one preference concerning the acoustic characteristics may comprise a message for instructing the second node 120 to apply the at least one preference concerning the acoustic characteristics when processing the audio stream. The processing of the audio stream comprises applying, at least partly, one of the at least one preference concerning the acoustic characteristics.

The second node 120 may send, to the first node 110, a message indicating the at least partly applied one of the at least one preference concerning the acoustic characteristics. This action is similar to action 206.

Action 504

The second node 120 processes the audio stream in response to the information relating to the at least one preference concerning the acoustic characteristics. This action is similar to action 208.

Action 505

The second node 120 transmits the audio stream to the first node 110. This action is similar to action 209.

State 506

In an end state 506, the second node 120 may continue transmission of the audio stream, as in action 209 above.

Alternatively, the second node 120 may in an end state 506 stop transmission of the audio stream.

Figure 6:
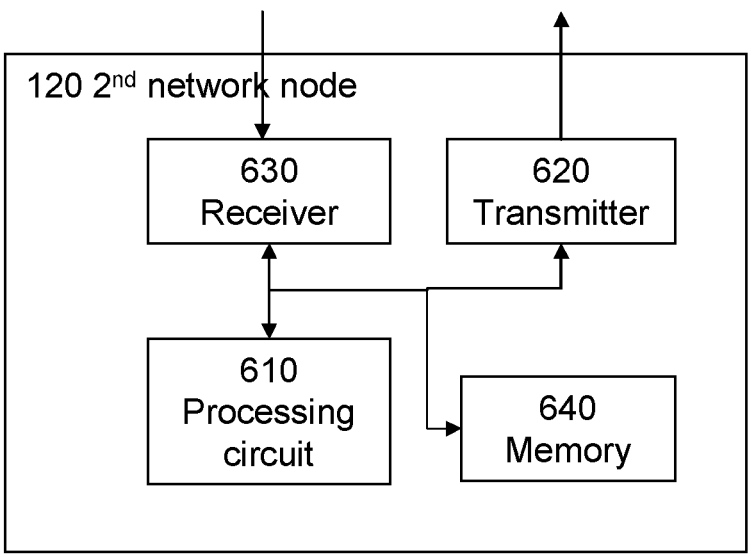
FIG. 6 is a block diagram illustrating embodiments of the second node.

In FIG. 6, a schematic block diagram of the second node 120 is shown. The second node 120 is configured to perform the methods in FIG. 2 and/or 5. Thus, the second node 120 is configured to enable management, by a first node 110, of processing of an audio stream. As mentioned, the audio stream is transmittable to the first node 110.

The second node 120 comprises a processing circuit 610 configured to receive, from the first node 110, information relating to at least one preference concerning acoustic characteristics of the audio stream. Moreover, the processing circuit 610 is configured to process the audio stream in response to the information relating to the at least one preference concerning the acoustic characteristics. Furthermore, the processing circuit 610 is configured to transmit the audio stream to the first node 110.

As mentioned, the at least one preference concerning acoustic characteristics may relate to one or more of: a level for suppression of noise in the audio stream, a level of speech in the audio stream, a bandwidth of the audio stream, and the like.

Again, the at least one preference concerning acoustic characteristics may be determined by a previous or current user of the first node 110. Alternatively, the at least one preference concerning acoustic characteristics may be determined by an operator of a radio communication system 100 comprising the first and second nodes 110, 120.

As mentioned, the information relating to at least one preference concerning acoustic characteristics may be comprised in one of: at least one SDP parameter in a SIP INVITE and Response message, at least one SDP parameter in a SIP UPDATE and Response message, at least one RTCP parameter, and an RTP header extension.

According the second embodiments, the information relating to the at least one preference concerning the acoustic characteristics comprises a message for instructing the second node 120 to apply the at least one preference concerning the acoustic characteristics when processing the audio stream. Then the processing circuit 610 further is configured to process the audio stream by applying, at least partly, one of the at least one preference concerning the acoustic characteristics. The processing circuit 610 may further be configured to send, to the first node 110, a message indicating the at least partly applied one of the at least one preference concerning the acoustic characteristics.

According to the first embodiments, the processing circuit 610 may further be configured to send, to the first node 110, a message indicating at least one preference concerning the acoustic characteristics to be applied by the second node 120 when processing the audio stream. The information relating to the at least one preference concerning the acoustic characteristics may comprise a message for acknowledging, at least partly, application, by the second node 120, of the at least one preference concerning the acoustic characteristics indicated in the received message indicating the at least one preference concerning the acoustic characteristics. Then, the processing circuit 610 may further be configured to process the audio stream by applying, at least as partly acknowledged, the at least one preference concerning the acoustic characteristics.

The second node 120 may further comprise a transmitter 620, which may be configured to send the message(s) and other numbers, values or parameters described herein.

The second node 120 may further comprise a receiver 630, which may be configured to receive the information relating to at least one preference concerning acoustic characteristics and other numbers, values or parameters described herein.

The second node 120 further comprises a memory 640 for storing software to be executed by, for example, the processing circuit. The software may comprise instructions to enable the processing circuit to perform the method in the second node 120 as described above in conjunction with FIG. 2 and/or 5.

Figure 7:
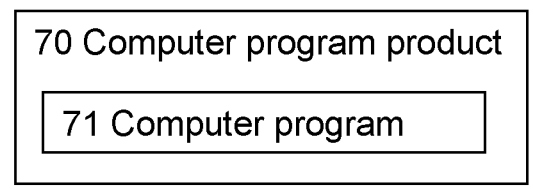
FIG. 7 is a block diagram illustrating a computer program product and a computer program for the first node.

In FIG. 7, a block diagram, representing a computer program 71 for managing processing of an audio stream, is shown. As mentioned, the audio stream is receivable from a second node 120. The computer program 71 comprises computer readable code units which when executed on a first node 110 causes the first node 110 to send, to the second node 120, information relating to at least one preference concerning acoustic characteristics of the audio stream. Moreover, the computer program enables the first node 110 to receive the audio stream from the second node 120. As mentioned, the audio stream has been processed, by the second node 120, in response to the information relating to the at least one preference concerning the acoustic characteristics of the audio stream.

Moreover, FIG. 7 illustrates a computer program product 70, comprising computer readable medium and a computer program 71. The computer program 71, as described above, is stored on the computer readable medium.

Figure 8:
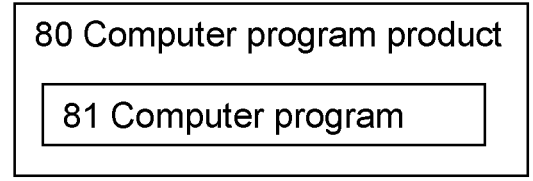
FIG. 8 is a block diagram illustrating a computer program product and a computer program for the second node.

In FIG. 8, a block diagram, representing a computer program 81 for enabling management, by a first node 110, of processing of an audio stream. As mentioned, the audio stream is transmittable by a second node 120. The computer program 81 comprises computer readable code units which when executed on the second node 120 causes the second node 120 to receive, from the first node 110, information relating to at least one preference concerning acoustic characteristics of the audio stream. Moreover, the second node 120 is caused to, when the computer program is executed on the second node 120, process the audio stream in response to the information relating to the at least one preference concerning the acoustic characteristics. Furthermore, the second node 120 is caused to, when the computer program is executed on the second node 120, transmit the audio stream to the first node 110.

Moreover, FIG. 8 illustrates a computer program product 80, comprising computer readable medium and a computer program 81. The computer program 81, as described above, is stored on the computer readable medium.

As used herein, the term "processing circuit" may be a processing unit, a processor, an application specific integrated circuit (ASIC), a field-programmable gate array (FPGA) or the like. As an example, a processor, an ASIC, an FPGA or the like may comprise one or more processor kernels. In some examples, the processing circuit may be embodied by a software or hardware module. Any such module may be a determining means, estimating means, calculating means, capturing means, associating means, comparing means, identification means, selecting means, receiving means, processing means, generating means, transmitting means, setting means, adjusting means, obtaining means, or the like. As an example, the expression "means" may be a unit, such as a determining unit, selecting unit, etc. Hence, as an example when the processing circuit is configured to estimate a value, the processing circuit may in that respect be replaced by an estimating unit configure to estimate a value.

As used herein, the term "memory" may be a hard disk, a magnetic storage medium, a portable computer diskette or disc, flash memory, random access memory (RAM) or the like. Furthermore, "a memory" may be an internal register memory of a processing circuit as described in connection with embodiments herein.

As used herein, the expression "configured to" may be that a processing circuit is configured to, or adapted to, by means of software or hardware configuration, perform one or more of the actions described herein.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

What is claimed is:

1. A method performed by a first node configured for operation in a communication network, the method comprising:
    determining a bandwidth preference associated with the communication network; and
    sending session signaling towards a second node via the communication network, requesting use of the bandwidth preference by the second node for encoding audio in an audio stream being sent, or to be sent, from the second node to the first node via a session between the first and second nodes.

2. The method of claim 1, wherein sending the session signaling towards the second node comprises indicating the bandwidth preference in session initiation signaling sent from the first node for establishing the session.

3. The method of claim 1, wherein sending the session signaling towards the second node comprises indicating the bandwidth preference while the session is ongoing, as an update to a current audio bandwidth setting in use for the audio stream at the second node.

4. The method of claim 1, further comprising determining whether the second node has agreed to use the bandwidth preference from an indication in return signaling received from the second node.

5. The method of claim 1, further comprising receiving the audio stream from the second node, the audio stream being encoded by the second node according to the bandwidth preference.

6. A first node configured for operation in a communication network, the first node comprising:
    communication circuitry for communicating via the communication network; and
    processing circuitry operatively associated with the communication circuitry and configured to:

determine a bandwidth preference associated with the communication network; and send session signaling towards a second node via the communication network, requesting use of the bandwidth preference by the second node for encoding audio in an audio stream being sent, or to be sent, from the second node to the first node via a session between the first and second nodes.

7. The first node of claim 6, wherein the processing circuitry is configured to send the session signaling towards the second node by indicating the bandwidth preference in session initiation signaling sent from the first node for establishing the session.

8. The first node of claim 6, wherein the processing circuitry is configured to send the session signaling towards the second node by indicating the bandwidth preference while the session is ongoing, as an update to a current audio bandwidth setting in use for the audio stream at the second node.

9. The first node of claim 6, wherein the processing circuitry is configured to determine whether the second node has agreed to use the bandwidth preference from an indication included in return signaling received from the second node.

10. The method of claim 6, wherein the processing circuitry is configured to receive the audio stream from the second node, the audio stream being encoded by the second node according to the bandwidth preference.

11. A method performed by a second node, the method comprising:

receiving session signaling from a first node that is communicatively coupled to the second node via a communication network, the session signaling being received for an audio stream being sent, or to be sent, from the second to the first node in a session between the first node and the second node;

determining a bandwidth preference indicated in the session signaling, the bandwidth preference indicating a bandwidth preference associated with the communication network, for encoding audio in the audio stream; and sending return session signaling towards the first node, indicating whether the second node will use the bandwidth preference.

12. The method of claim 11, wherein receiving the session signaling comprises receiving session initiation signaling for establishing the session.

13. The method of claim 11, wherein receiving the session signaling comprises receiving the session signaling while the session is ongoing, such that the acoustic preference represents a requested update to a current audio bandwidth setting in use for the audio stream at the second node.

14. The method of claim 11, further comprising adopting the bandwidth preference at the second node, and sending the audio stream to the first node, as generated according to the bandwidth preference.

15. A second node comprising:
communication circuitry; and
processing circuitry configured to:
receive, via the communication circuitry, session signaling from a first node that is communicatively coupled to the second node via a communication network, the session signaling being received for an audio stream being sent, or to be sent, from the second to the first node in a session between the first node and the second node;

determine a bandwidth preference indicated in the session signaling, the bandwidth preference indicating a bandwidth preference associated with the communication network, for encoding audio in the audio stream; and send, via the communication circuitry, return session signaling towards the first node, indicating whether the second node will use the bandwidth preference.

16. The second node of claim 15, wherein the processing circuitry is configured to receive the session signaling as session initiation signaling for establishing the session.

17. The second node of claim 15, wherein the processing circuitry is configured to receive the session signaling while the session is ongoing, such that the acoustic preference represents a requested update to a current audio bandwidth setting in use for the audio stream at the second node.

18. The second node of claim 15, wherein the processing circuitry is configured to adopt the bandwidth preference at the second node and send the audio stream to the first node via the communication circuitry, as generated according to the bandwidth preference.

* * * * *